Figure 1:
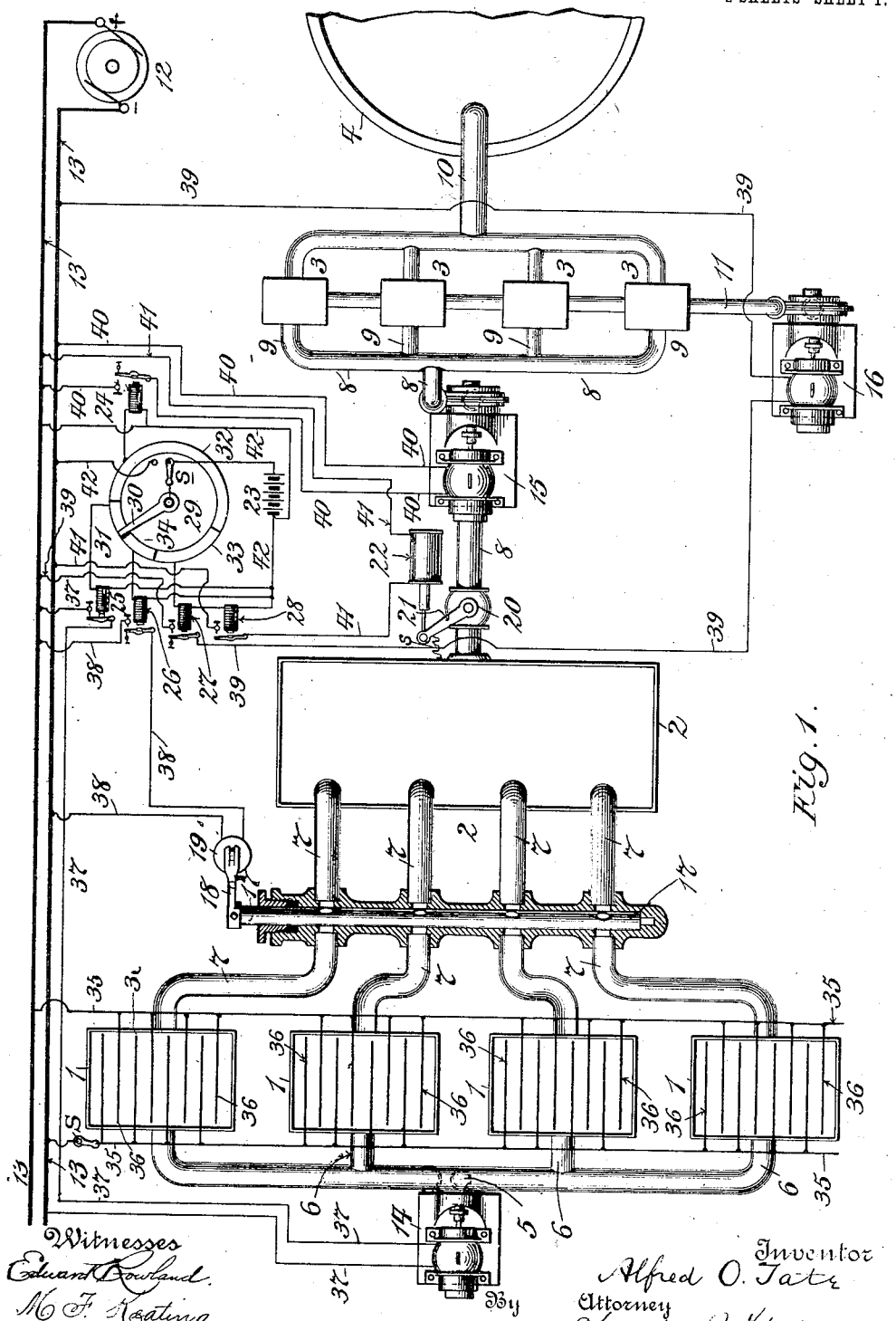

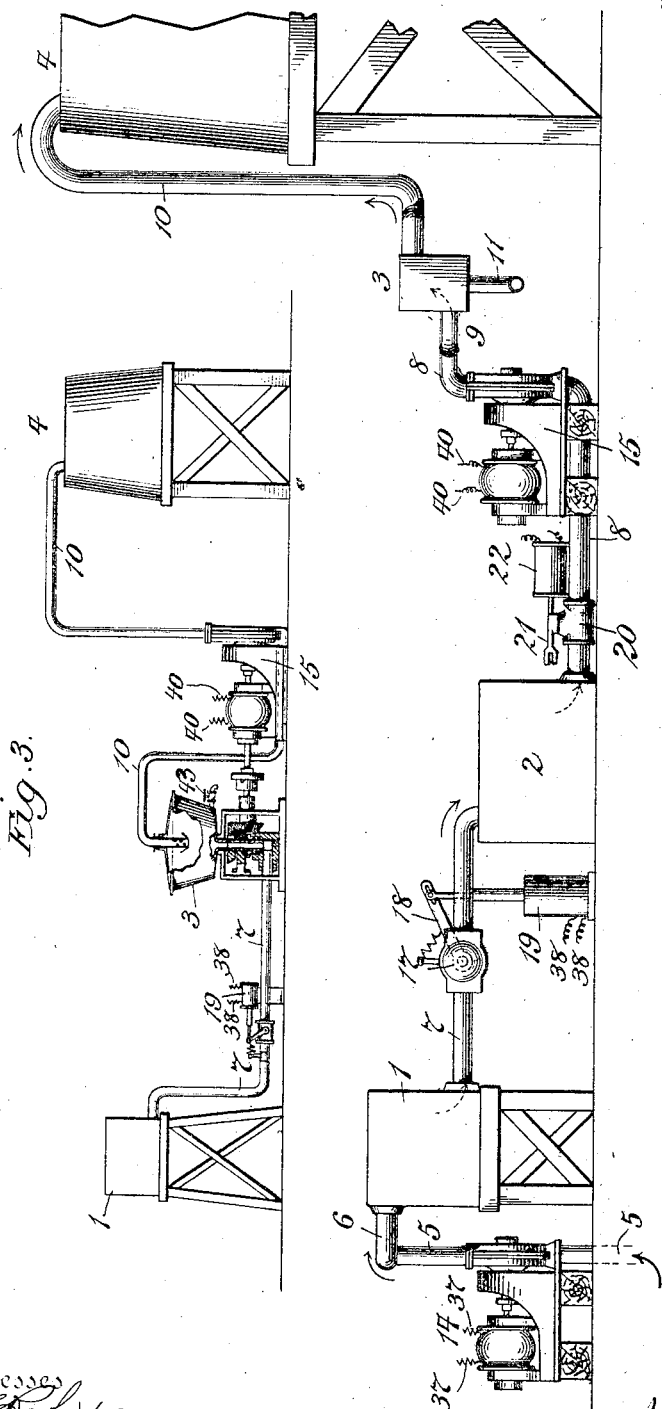

UNITED STATES PATENT OFFICE.

ALFRED O. TATE, OF BROOKLYN, NEW YORK.

APPARATUS FOR PURIFYING WATER.

No. 860,771.  Specification of Letters Patent.  Patented July 23, 1907.

Application filed July 27, 1904, Serial No. 218,439. Renewed December 15, 1906. Serial No. 348,029.

*To all whom it may concern:*

Be it known that I, ALFRED O. TATE, a subject of the King of Great Britain, residing at Brooklyn, county of Kings, and State of New York, have made a new and useful Invention in Apparatus for Purifying Water, of which the following is a specification.

My invention is directed particularly to novel apparatus for purifying water through the agency of electricity and filtering or separating devices, the arrangement being such that the water is first subjected to the electrolytic action of a current of electricity and is afterwards subjected to separating apparatus, either in the nature of a filter or apparatus which will separate or disintegrate matter from the water by reason of the difference of specific gravity of the two, and it has for its objects, First, the arrangement of such apparatus as will effectually accomplish these results as speedily as possible, the electrolytic action and the separating action being effected in successive steps so as to thereby admit of the purification of the water in large quantities. Second, to so arrange such an apparatus that it will be automatic in its operation and that the filtering or separating device may be automatically flushed after each operation.
There are many instances where the only practical supply of water for use in large quantities is to be had from flowing streams or wells and in such instances it often occurs that the water is supercharged with minerals and other soluble substances which have deleterious qualities when it is designed to use them for special purposes; such, for instance, as the making of steam for use in connection with railway or other engines. It is highly important, therefore, under such conditions that such water shall be so treated as to remove the objectionable matter. Attempts have heretofore been made in this particular by the use of electrolytic devices to effect the result sought, and while the separation has been effected in a manner, it has not, in so far as I am aware, been practically accomplished in such manner as to make it possible to use large volumes of water, and it was with a view of accomplishing this result in particular that the present invention was devised.

For a full and clear understanding of the invention, such as will enable others skilled in the art to construct and use the same, reference is had to the accompanying drawings, in which, Figure 1 is a diagrammatic view illustrating the apparatus complete, parts of the mechanism being shown in plan view. Fig. 2 is a side elevational view of the apparatus as seen looking at Fig. 1 from the bottom toward the top of the drawing, the exhaust pump, however, seen at the bottom and right of Fig. 1, not being shown in this view. Fig. 3 is a side elevational view of a modified form of the invention in which a rotary separator is used, the latter being shown partly in broken sectional view, the means of rotating it being shown also in sectional view.

Referring now to the drawings in detail, in all of which like numerals and letters of reference represent like or equivalent parts wherever used and first to Fig. 1, 1, 1, 1, 1 represent four electrolytic tanks each of relatively large holding capacity located upon a proper foundation and at a common level, and 2 represents a storage tank at lower level and having preferably the holding capacity of all four of the electrolytic tanks; 3, 3, 3, 3, being wholly inclosed filtering tanks in which are located respectively filters of any desired form.

4 is the consumption tank from which the treated water may be drawn for use when desired.

5 is the supply pipe running from the supply of water to be treated to and through a force pump, the upper end of said pipe being divided into four branches 6, 6, 6, 6, running one to the top of each of the electrolytic tanks 1, 1, 1, 1.

7, 7, 7, 7, are outlet pipes running from the bottom of each electrolytic tank into the storage tank 2. 8 is a pipe running from the bottom of the storage tank to and through a second force pump and connected at its upper end to four branch pipes 9, 9, 9, 9, running to the bottom of the filtering tanks 3, 3, 3, 3. Four outlet pipes connected to the upper parts of the tanks 3, 3, 3, 3, are connected together to a single pipe 10 extending upward and into the top of the consumption tank 4.

11 is a flushing pipe connected to the bottom of all of the filtering tanks and to a suction pump for flushing said tanks.

12 is a source of electrical energy, as a dynamo, driven by any source of power and having sufficient voltage and ampere capacity to supply the entire plant through current feeders 13, 13.

14, 15, 16 are electric motors for operating the respective pumps to which they are attached.

17 is a rotary cock having multiple ports for effecting the stoppage or flow of the water through the pipes 7, 7, 7, 7, 18 being an operating arm for said cock having its free end attached to a solenoid core controlled by a solenoid 19.

20 is a cock in the pipe 8 having an operating arm 21 operatively connected to the core of a controlling solenoid 22 and to a restoring spring *s*.

23 is a storage battery and 24, 25, 26, 27 and 28 are controlling electromagnets adapted to be included in circuit therewith.

29 is a circuit controlling device having a conducting arm 30 operatively connected with a time mechanism, not shown, adapted to be driven at a definite speed, so that the free end of said arm shall be rotated over circularly disposed contact plates 31, 32, 33, 34 electrically connected to the above mentioned electromagnets.

35, 35, are branch feeders connected in multiple arc with the main feeders 13, 13 by a switch *s* and two pairs of plate electrodes 36, 36, arranged as shown in the electrolytic tanks 1, 1, 1, 1, the arrangement being such that when the switch S is closed and the dynamo 12 set in operation with the tanks full of water the latter will be subjected to electric treatment.

37 is a branch conductor connected to one side of the armature of the electromagnet 25 and on the other to and through the pump electric motor 14. 38 is a similar branch conductor connected on one side to the armature of the electromagnet 26 and on the other to and through the solenoid 19. 39 and 40 are similar branch conductors connected with the motors 16 and 15 and the armatures of the electromagnets 27 and 24. 41 is a similar branch conductor connected with the controlling solenoid 22 and the armature of the electromagnet 28.

42 is a multiple arc branch circuit connected with the storage battery 23 and switch s, its function being to connect the storage battery either to the contact arm 30 of the circuit controlling device 29, or to the dynamo 12 so as to charge the battery when desired.

The operation is as follows—Suppose that the apparatus has been in operation to such an extent as to have partially filled the consumption tank 4 and that the time mechanism has rotated the arm 30 to the position shown. A circuit is closed from the battery 23 through the switch s, contact arm 30, contact plate 31, through the magnet 25, to the other pole of the battery so that the armature of that magnet is drawn forward and circuit is closed from the + pole of the dynamo 12 by way of the upper feeder 13, conductor 37, armature of magnet 25, conductor 37, electric motor 14, conductor 37, to the other feeder; consequently, the pump operated by the motor 14 is set in operation pumping water into the tanks 1, 1, 1, 1 during the time that the arm 30 is moving over the contact plate 31, say for a period of five minutes, at the end of which time the tanks will be filled. Electrolytic action is immediately set up in all of the tanks through the electrodes 36 and branch feeders 35, so that the water therein is subjected to treatment from the time that the pump 14 was set in operation. As the arm 30 advances it passes upon the contact plate 32 at which time a circuit is closed from the battery 23 as before through the switch s, arm 30, contact plate 32 and electromagnet 24, thus causing the armature lever of that electromagnet to be drawn forward against the front contact stop and close a multiple arc branch circuit from the positive pole of the dynamo 12 by way of branch conductor 40 through the motor 15 which controls the operation of the pump for pumping water through the filters 3, 3, 3, 3; the cock 20 and the pipe 8 being open at that time and the ports of the cock 17 being closed to the outlet pipes 7, 7, 7, 7, of the electrolytic tanks 1, 1, 1, 1; hence the motor 15 acts during the period that the arm 30 is passing over the contact plate 32, say for a period of 30 minutes, to pump the water out of the storage tank 2 and force it upward through the filters in the tanks 3, 3, 3, 3, and ultimately into the consumption tank 4. At the end of thirty minutes, therefore, the free end of the arm 30 moves upon the contact plate 33, disconnecting the motor 15 from the circuit and circuit is now closed from the battery 23 in the manner before indicated through the two electromagnets 27 and 28 in series relation, thus causing their armatures to be drawn forward so that two multiple arc branch circuits 39 and 41 are closed from the dynamo 12, one 41 to the solenoid 40 which acting upon its core through the arm 21 closes the cock 20, and the other 39, through the motor 16 controlling the operation of the exhaust pump, withdraws so much of the water as remains in the filter and in the pipe 10 between the same and the consumption tank 4, backward with sufficient velocity to effectually flush the same. This takes place during the period of say ten minutes from the time that the contact arm 30 passes over the contact plate 33 and enters upon the contact plate 34, at which time circuit is broken to the two magnets 27 and 28 thus disconnecting the motor 16 and the controlling solenoid 22 from the circuit and permitting the spiral spring S to restore the cock 20 to its original position. When the arm 30 passes upon section 34, however, an additional branch circuit is closed from the battery 23 through the magnet 26, so that the armature thereof is drawn forward and a branch circuit 38 is closed from the dynamo to the controlling solenoid 19, thus turning the cock 17 so that all of the ports are open and will allow the water which has been now fully treated for forty-five minutes in the electrolytic tanks to flow therefrom into the storage tank 2. This discharge takes place for a period of say five minutes or during the time that the arm 30 is passing over the contact plate 34. When said arm 30 passes again upon the contact plate 31 the cock 17 is restored to its original position and the controlling solenoid having been demagnetized and the electrolytic tanks 1, 1 1 1 having been emptied, the motor 14 is again started up and the operation is repeated and so on indefinitely, the entire operation being wholly automatic and in sequence.

In Fig. 1 of the drawings I have described the filters 3, 3, 3, 3, as being of any well known type so disposed that the flushing action, when the flushing motor 16 is set in motion, will be downward in the direction of the action of gravity and in a reverse direction from that in which the water is forced therethrough.

In Fig. 3 of the drawings I have disclosed a modified form of the separating apparatus in which I have displaced the filters and substituted therefor a rotary separator which is similar in all respects to any of the well known types of rotary centrifugal separators, the same being geared through bevel gear-wheels to the motor 15 which controls the operation of the force pump that delivers the water to the consumption tank, said motor being connected in circuit with the dynamo 12 through a circuit closing device 29, as before, and the arrangement such that when this motor is operated the pump will draw the water out of the rotary separator. In this form of the invention I do away with the interconnected storage tank 2 and connect the electrolytic tanks 1, 1, 1, 1 directly with the rotary separator, the solenoid 19 being connected to a controlling cock as before and properly connected by conductors 38, 38 to the circuit controlling devices 29, it being obvious that by a proper arrangement of circuits the same result may be effected automatically that is effected with the apparatus disclosed in Fig. 1. When it is desired to flush the rotary separator shown in Fig. 3 the cock 43 is opened and the motor 15 disconnected from the driving gearing by any form of clutch; said motor is then reversed so as to draw the water through the pipe 10 from the consumption tank 4 and force it downward and outward through the separator and the cock 43. Or, if preferred the cock 43 may be opened and the motor reversed in operation so that water will be forced into the rotary separator and out through the cock 43 while it is rotated, thus thoroughly cleansing the separator, or the cock may be left open while running.

I do not limit my invention to the especial details of construction disclosed in the accompanying drawings and hereinbefore described as many of the features thereof may be materially departed from and still come within the scope of my claims hereinafter made. To make a single illustration, in places where there is sufficient head of water the motor 14 may be done away with and the water allowed to flow into the electrolytic tanks by gravity, the flow thereof being checked at the desired times by automatically actuated cocks, and all of the electric motors might be replaced by water or steam driven motors, such matters being wholly within the skill of those versed in the arts of the utilization of power.

I believe it is broadly new with me to effect the separation and disintegration of solid matter from predetermined volumes or quantities of water through the combined agency of electrolytic action and power driven separating devices successively actuated, and my claims hereinafter made are generic as to this feature and also as to apparatus or means for effecting the method of operation hereinbefore described.

I am aware that it has heretofore been proposed to treat water electrolytically a sufficient length of time to disintegrate or precipitate the solids while it is flowing continuously through an electrolytic tank and to afterwards subject the water thus treated to a filtering process in which it was also caused to flow continuously through the filter by the force of gravity or by a power driven force pump, and I make no claim hereinafter broad enough to include such a method of operation or such a structural device for practicing said method.

Having thus described my invention what I claim and desire to secure by Letters Patent of the United States is—

1. An apparatus for purifying water holding solids in solution, consisting of means for treating the same electrolytically a sufficient length of time to disintegrate or precipitate the solids in the water; in combination with means for separating the solids therefrom and power driven means for forcing the water therethrough; together with means for flushing the separating means, and electrically controlled devices for effecting the operation of all of said means in sequence, substantially as described.

2. An apparatus for purifying water holding solids in solution embracing a tank and electrolytic means located therein; in combination with a separator operatively connected thereto and means for preventing the outflow of water to the separator while being treated; together with means for automatically releasing the water in the treating tank after a predetermined length of treatment, substantially as described.

3. An apparatus for purifying water holding solids in solution, consisting of means for treating the same electrolytically a sufficient length of time to disintegrate or precipitate the solids in the water; in combination with means for separating the solids therefrom; together with time controlled means operatively connected to the aforesaid means for effecting the electrolytic treatment for a definite time and for subsequently subjecting the treated water to the separating means for a definite time, substantially as described.

4. An apparatus for purifying water holding solids in solution, consisting of one or more electrolytic tanks inclosing electrodes connected to a source of electrical energy and one or more separators for separating the disintegrated or precipitated solids after electrolytic treatment; in combination with power driven mechanism for forcing the water through the separator or separators; together with time controlled mechanism operatively connected with means for regulating the flow of the water from the electrolytic tanks to the separators and also operatively connected with power driven mechanism for effecting the flow of the water through the separators, substantially as described.

5. An apparatus for purifying water holding solids in solution, consisting of one or more electrolytic tanks provided with electrodes connected in circuit with a source of electrical energy; one or more separators interconnected with the before-mentioned tank or tanks by pipes; cocks located in said pipes for regulating the flow of water therethrough; a power driven pump for forcing the water through the separator or separators; a time operated circuit controlling device operatively connected with a source of electrical energy and with the before-mentioned cocks and with power driven mechanism; together with flushing means for flushing the separators, substantially as described.

6. An apparatus for purifying water holding solids in solution, consisting of one or more electrolytic tanks provided with electrodes connected in circuit with a source of electrical energy; one or more separators interconnected with the before-mentioned tank or tanks by pipes; cocks located in said pipes for regulating the flow of water therethrough; a power driven pump for forcing the water through the separator or separators; a time operated circuit controlling device, electromagnets, circuits and circuit connections operatively connected with a source of electrical energy and with the before-mentioned cocks and with power driven mechanism; together with flushing means for flushing the separators, substantially as described.

7. An apparatus for purifying water holding solids in solution, consisting of one or more electrolytic tanks provided with electrodes connected in circuit with a source of electrical energy; one or more separators interconnected with the before-mentioned tank or tanks by pipes; cocks located in said pipes for regulating the flow of water therethrough; solenoids for controlling the movement of the cocks; a pump for forcing the water through the separator or separators, and an electric motor operatively connected thereto; in combination with a time operated circuit controlling device; a source of electrical energy; electromagnets, circuits and circuit connections between the source of electrical energy, the controlling solenoids and the electric motor, all acting substantially as described.

8. An apparatus for purifying water holding solids in solution, embracing a source of electrical energy; one or more electrolytic tanks provided with electrodes operatively connected thereto; a pump operatively connected with a source of water supply and with said tanks; an electric motor for driving the same; one or more separators connected with the before-mentioned tank or tanks by pipes provided with a cock or cocks for controlling the flow of the water therethrough, and a pump for forcing the water through the separator or separators; in combination with an electric motor for driving said pump; a solenoid or solenoids for controlling the operation of the cocks, and a time operated circuit controlling device operatively connected with a source of electrical energy, with electromagnets and circuits and circuit connections for controlling the operation of the various parts of the apparatus in sequence, said electric motors being normally disconnected from the before-mentioned source of electrical energy, substantially as described.

9. An apparatus for purifying water holding solids in solution embracing a source of electrical energy; one or more electrolytic tanks provided with electrodes operatively connected to said source; separating means for effecting the separation of the disintegrated matter from the electrolytically treated water; together with interconnecting means whereby a definite quantity of water is first treated electrolytically and subsequently subjected to a separating action, the arrangement being such that when one volume of water is being treated electrically a similar preceding volume thereof is simultaneously being acted upon by the separating means, substantially as described.

10. An apparatus for purifying water holding solids in solution embracing one or more electrolytic tanks provided with electrodes operatively connected to a source of electrical energy and a storage tank provided with means for withdrawing the water from the electrolytic tank or tanks; in combination with separating means operatively connected with the storage tank for separating the disintegrated matter from the electrolytically treated water; together with means for independently effecting the successive action of the electrolytic apparatus and the separating apparatus, substantially as described.

11. An apparatus for purifying water holding solids in solution embracing a tank and electrolytic means located therein; in combination with separating means located at a lower level than the tank for effecting the separation of the solids after electrolytic treatment; together with time controlled means for releasing the water from the tank after it has been treated a predetermined length of time and permitting it to flow into the separator, substantially as described.

12. An apparatus for purifying water holding solids in solution embracing a tank and electrolytic means located therein; in combination with a separator operatively connected thereto by a pipe provided with a cock; together with time controlled releasing means operatively connected with the cock, the arrangement being such that after the water has been electrolytically treated in the tank it will be automatically admitted into the separator, substantially as described.

13. An apparatus for purifying water embracing two tanks, one located at a higher level than the other and provided with electrolytic means, said tanks being operatively connected together; in combination with time controlled means for releasing the water from the first-named tank after it has been treated a predetermined length of time and for permitting it to flow into the second-named tank, substantially as described.

14. An apparatus for purifying water embracing electrolytic means located in a tank; a separating tank located below the first-named tank; one or more pipes operatively connecting said tanks; a cock located in one of said pipes and operatively controlled by an electromagnet or solenoid located in circuit with time controlled means adapted to energize the solenoid after the water has been treated a predetermined length of time, substantially as described.

15. Means for purifying water embracing an electrolytic apparatus located within a vessel or tank; a second vessel or tank embracing separating means and operatively connected to the first-named tank; in combination with time controlled means for permitting of the flow of water from the first-named vessel or tank into the second-named vessel or tank after a predetermined length of time, substantially as described.

In testimony whereof I have signed my name to this specification in the presence of two subscribing witnesses.

ALFRED O. TATE.

Witnesses:
C. J. KINTNER,
M. F. KEATING.